Figure 1:
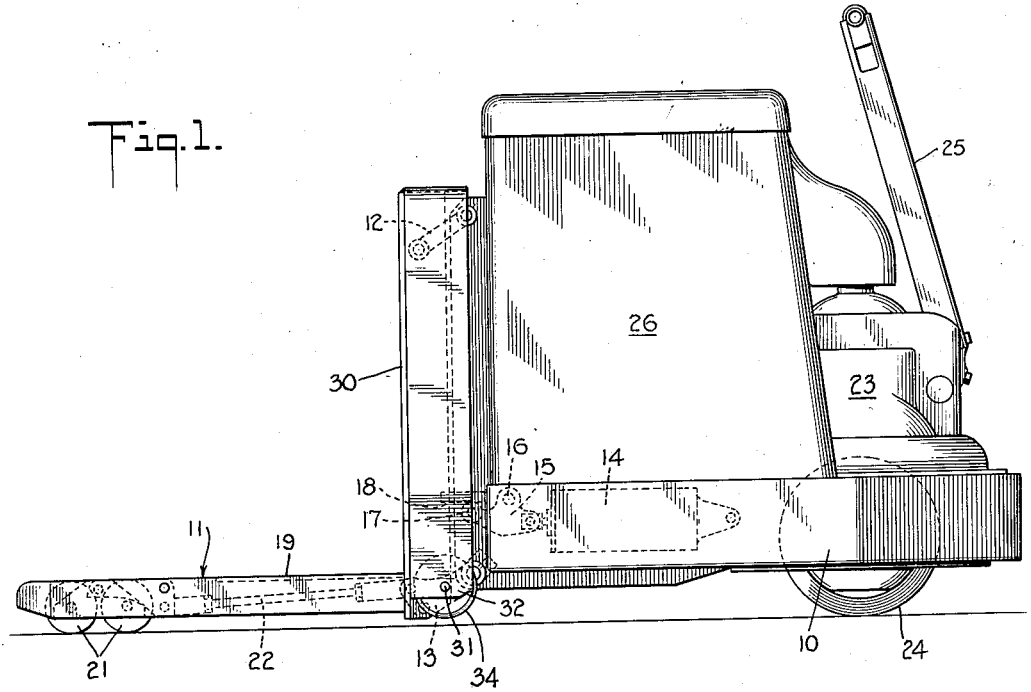

Oct. 21, 1952  G. F. QUAYLE  2,614,643
STABILIZER FOR LIFT TRUCKS
Filed June 4, 1947  2 SHEETS—SHEET 1

INVENTOR
George F. Quayle
BY
A.H. Golden
ATTORNEY

Oct. 21, 1952   G. F. QUAYLE   2,614,643
STABILIZER FOR LIFT TRUCKS
Filed June 4, 1947   2 SHEETS—SHEET 2
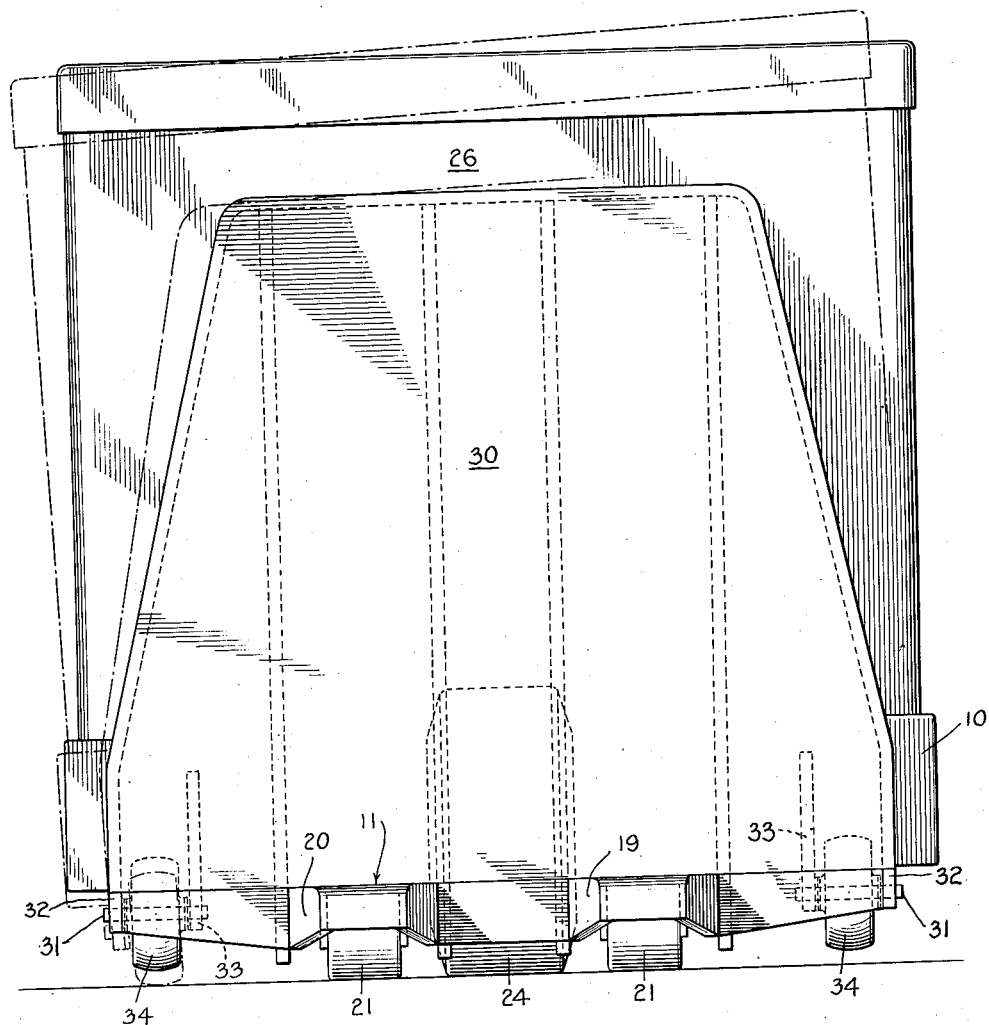
Fig. 3.
Fig. 4.
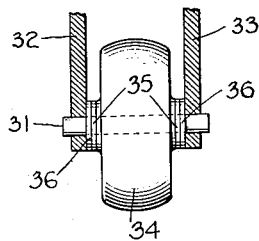
INVENTOR
George F. Quayle
BY A. H. Golden
ATTORNEY Patented Oct. 21, 1952

2,614,643

UNITED STATES PATENT OFFICE 2,614,643

STABILIZER FOR LIFT TRUCKS

George F. Quayle, Philadelphia, Pa., assignor to The Yale & Towne Manufacturing Company, Stamford, Conn., a corporation of Connecticut Application June 4, 1947, Serial No. 752,333

2 Claims. (Cl. 180—21)

This invention relates to a motorized lift truck, and more particularly to that type of a motorized lift truck disclosed in the Schroeder Patent No. 2,399,605, issued April 30, 1946, and the Framhein Patent No. 2,327,583, issued August 27, 1943. Even more particularly, my invention relates to a type of truck shown in the Schroeder pending application, Ser. No. 650,479, filed February 27, 1946, now Patent No. 2,548,322, issued April 10, 1951.

In trucks of the particular class indicated, it is customary to mount power traction mechanism at the forward end for actuating a traction or drive wheel, the drive wheel being adapted for steering movement by a steering handle on which is placed switch mechanism for controlling the traction mechanism. The usual truck extends rearwardly for quite some distance from its forward drive wheel, and at its rear end is supported by laterally spaced load wheels. In some trucks these load wheels will be widely spaced, but in some trucks the load wheels will be rather close to one another. When the truck is moving with no load deposited thereon, its center of gravity is very close to the forward drive wheel, as most of the weight of the truck is at the front end, and includes a battery, motor, and lifting mechanism. If the truck is steered sharply to one side under the conditions just outlined, it will tend to tip because the center of gravity is so close to the forward wheel that the stabilizing influence of the two spaced rear wheels is not very great. This tendency of trucks of the particular class to tip, especially when the rear of the truck is narrow, is well known in the art and efforts have been made to provide means for stabilizing such trucks. It is the object of this invention to contribute to the art a simple and effective means for stabilizing a truck of the particular class described.

As one feature of my invention, I utilize a pair of intermediate wheels secured to the truck in laterally spaced position, and intermediate the rear wheels and the forward drive wheel. The intermediate wheels are adapted to coact with one of the load wheels and the forward drive wheel to stabilize the truck when the truck tilts through the lifting of the other of its load wheels off the ground. It is this coaction of one of the intermediate wheels with the single forward drive wheel and one of the rear load wheels to determine a ground support plane that distinguishes the broad phases of my invention from outrigger wheels of the prior art trucks.

As a further feature of the invention, the intermediate wheels are preferably normally spaced from the ground plane determined by the drive wheel and the load wheels, and one or the other of said intermediate wheels will move against the ground plane when the truck tilts.

As still a further feature of the invention, each of the intermediate wheels has a rounded outer periphery so that the intermediate wheels will roll bodily with the truck and relatively to the ground plane when the truck tilts relatively to the ground plane. Of course, this rolling action will be on an axis transverse to the axis on which the intermediate wheels normally rotate. Those skilled in the art will appreciate that because of this rolling action, the intermediate wheels tend better to stabilize the truck, and to prevent its jogging between opposed tilted positions, as well as its tipping over on its side. Moreover, through the particular co-action of the intermediate wheels with the ground plane, there is no tendency for the wheels to dig into the floor on which the truck is driven so that damage to the floor is avoided.

As a still more particular feature of the invention, suitable thrust means are provided for the intermediate wheels so that they may rotate while rolling bodily with the truck against the ground plane transversely to their normal axis of rotation.

A still further feature of the invention resides in the placing of the intermediate wheels on the elevating platform of the truck so that the wheels will be in a position to function only when the elevating platform is lowered, thereby not hindering the movement of the truck when it is loaded and its platform elevated, all as those skilled in the art will fully appreciate.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is an elevation of a truck embodying my invention.

Figure 2:
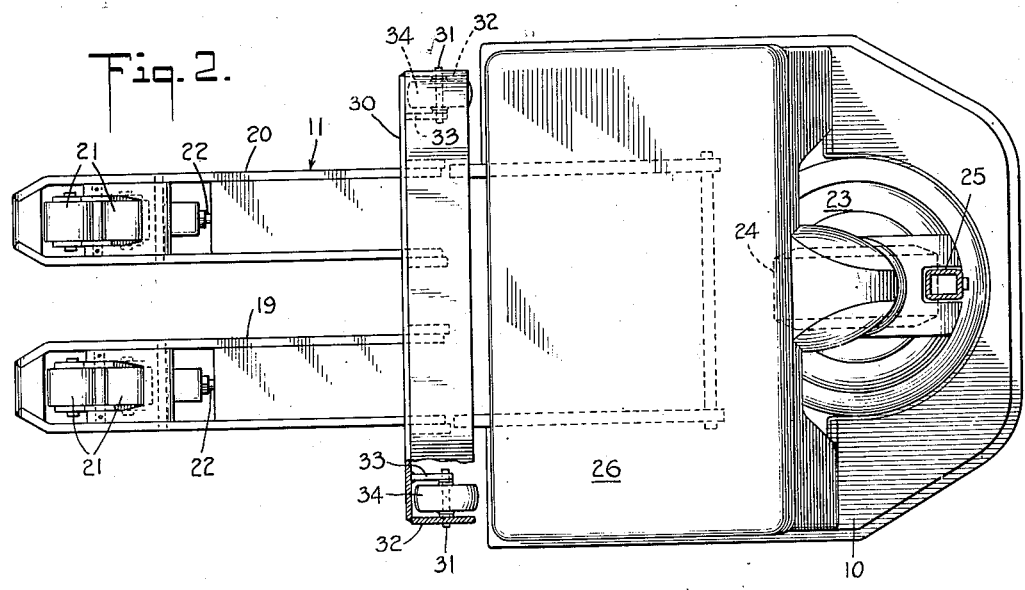

Fig. 2 is a view looking downwardly on the truck of Fig. 1. Fig. 3 is an elevation looking from the rear of the truck toward the front thereof. Fig. 4 is an enlarged detail showing the manner in which one of the intermediate wheels is mounted.

Referring now more particularly to the drawings, a truck in which my invention may be embodied is shown having a lifting head 10 and an elevating platform 11. The elevating platform 11 is pivoted to the lifting head 10 through upper and lower links designated by reference numerals 12 and 13 whereby through suitable means the elevating platform may be raised upwardly relatively to the lifting head 10. It will be well to indicate at this point, that the particular means for mounting the elevating platform relatively to the lifting head and for lifting the elevating platform relatively to the lifting head are well set forth in the application of Charles Schroeder, supra, to which reference may be made. I shall here merely describe quite generally the construction of the truck, since my invention is independent of the particular construction and is capable of use with any truck of the same general class.

For lifting the elevating platform, my lifting head 10 has mounted thereon a ram assembly 14 adapted to rotate a lifting crank 15 about an axis 16 whereby the part 17 of the crank acts against a surface 18 of the elevating platform 11 to raise the platform on the links 12 and 13.

The elevating platform 13 is of that type equipped with a pair of spaced legs 19 and 20 of the class well known in the art. Each leg 19, 20 has a pair of load wheels 21 adapted for lifting movement through action of a rod 22, the two rods 22 being actuated by movement of the lower links 13, all as those skilled in the art will appreciate, and as is set forth in the Schroeder application.

The forward end of the lifting head 10 supports a suitable traction mechanism 23 having formed as part thereof a traction or drive wheel 24, the entire assembly comprising the drive wheel and traction mechanism being rotatable on the lifting head 10 by a steering lever 25. Supported also on the lifting head 10 for actuating the traction mechanism 23 is a large battery casing 26 within which is mounted a heavy storage battery.

As has already been indicated generally, when the truck illustrated in the drawings is unloaded, its longitudinal center of gravity will be very close to the single drive wheel 24. Because of this relationship of the parts, the opposed load wheels 21 will exert very little stabilizing influence, and the truck will have a great tendency to tip about the drive wheel 24, raising one or the other of the pairs of load wheels 21 off the ground. The condition thus created is extremely dangerous, and as I have already pointed out generally, efforts have been made to contribute constructions that will not be subject to the particular defect. The means that I have devised I have already found through actual test to be extremely valuable and effective while inexpensive and not interfering with the operation of the truck, and I shall now describe those means.

The forward end of the elevating platform 11 is formed with a vertical standard 30, and at each side of the standard 30 as best shown in Figs. 2 and 3, there is supported a short bearing shaft 31. Each bearing shaft 31 extends between a plate 32 and a plate 33 of the standard 30, and the shafts 31 are suitably secured against endwise movement relatively to the said plates. Supported for rotation on each bearing shaft 31 is what I call an intermediate wheel 34. These wheels 34 are preferably made of a plastic material that is relatively hard, but I can use aluminum, steel, hard rubber, or any other desirable material, depending on the floor or ground on which the truck will move. Thrust washers 35, 36 are provided at each side of each intermediate wheel 34 as probably best shown in Fig. 4 to accept end thrust under conditions to be presently indicated. It will be noted further that each of the wheels 34 has a rounded periphery, also for an important purpose now to be described.

When the truck of my invention tilts toward the dash and dotted line position shown at the left in Fig. 3, the right hand pair of load wheels 21 shown in Fig. 3 will be raised from the ground and the left intermediate wheel 34 will contact the ground. It will be noted that intermediate wheel 34 will contact the ground not at its edge, as would be the case were the outer periphery thereof conventional; rather, the contact will be at a part of the rounded periphery of the wheel 34, and obviously this means that the floor will not be damaged as would be the case were a sharp edge to strike the floor.

In addition, the rounded peripheral surface of the wheel 34 will allow the entire truck to roll relatively to the ground to an extreme position, after which the truck will roll back to its straight up and down position shown in solid lines in Fig. 3, or even to a tilted position to the right of the said solid line position. During a considerable portion of this rolling movement, the truck will be supported at all times by a part of the intermediate wheel 34, whereas were the wheel 34 even along its periphery instead of rounded, it would merely contact the floor at one edge thereof, then leave the floor, while perhaps the other intermediate wheel contacted the floor with one of its sharp edges. In effect, we would have a sharp jogging or rocking action instead of the rolling action of my invention.

It will, therefore, be observed that through the utilization of the simple expedient of a rounded wheel, I obtain a rolling motion of my truck when it tends to tilt. I, therefore, obtain a very effective stabilizing action through the utilization of my intermediate wheels 34. It will, of course, be obvious at this time that during this rolling action of the truck bodily with one or the other of the intermediate wheels, the thrust washers accept the thrust against the wheels and facilitate the rotation of the wheels in the event the truck is moving forwardly during the tilting movement thereof.

Because the intermediate wheels are mounted on the elevating platform of the truck, it is, of course, obvious also that the elevating movement of the platform will withdraw the wheels from their lowered position shown best in Fig. 1. Therefore, when the elevating platform is raised, which is generally the condition of the truck if it is loaded and moving, the intermediate wheels will not be in a position to strike impediments, as would be the case were the wheels mounted on the lifting head 10.

I believe that the obvious merits of my invention and its considerable contribution to the art, together with its great simplicity, will now be apparent to those skilled in the art.

I now claim:

1. In a truck of the class described, a lifting head, a drive wheel rotatably mounted at the forward end of said lifting head, drive means for rotating said drive wheel whereby the ground contacting portion of said drive wheel exerts a thrust for propelling said truck, laterally spaced load wheels at the rear of said truck coacting with said forward drive wheel for supporting said truck for normal movement on said wheels, intermediate wheels having metal ground contacting rims, mounting means for said intermediate wheels positioned at laterally spaced points of said truck relatively to said drive wheel and said intermediate wheels being disposed with their entire peripheries behind the nearest portion of the periphery of the drive wheel and in front of the nearest portion of the peripheries of the load wheels, said mounting means holding said intermediate wheels normally spaced from a ground plane determined by the drive and load wheels, and one of said intermediate wheels contacting the said ground plane when said truck tips relatively to said plane through the lifting of one of said load wheels off said ground plane, each of said intermediate wheels having the periphery of its metal ground contacting rim rounded so as to roll bodily with the truck against the ground plane on an axis including the ground contacting portions of said drive wheel and one of said laterally spaced load wheels upon said tipping of the truck.

2. In a truck of the class described, a lifting head, a drive wheel rotatably mounted at the forward end of said lifting head, drive means for rotating said drive wheel whereby the ground contacting portion of said drive wheel exerts a thrust for propelling said truck, laterally spaced load wheels at the rear of said truck coacting with said forward drive wheel for supporting said truck for movement, intermediate wheels having metal ground contacting rims, mounting means for said intermediate wheels positiond at laterally spaced points of said truck relatively to said drive wheel and said intermediate wheels being disposed with their entire peripheries behind the nearest portion of the periphery of the drive wheel and in front of the nearest portion of the peripheries of the load wheels, said mounting means holding said intermediate wheels normally spaced from a ground plane determined by the drive and load wheels, one of said intermediate wheels contacting the said ground plane when said truck tips relatively to said plane through the lifting of one of said load wheels off said ground plane, each of said intermediate wheels having the periphery of its metal ground contacting rim rounded so as to roll bodily with the truck against the ground plane on an axis including the ground contacting portions of said drive wheel and one of said laterally spaced load wheels upon said tipping of the truck, and thrust bearings for each of said intermediate wheels for accepting the end thrust against said wheels as they roll with the truck.

GEORGE F. QUAYLE.

REFERENCES CITED

The following references are of record in the file of this patent:

UNITED STATES PATENTS

| Number | Name | Date |
| --- | --- | --- |
| 761,564 | Walker | May 31, 1904 |
| 1,588,419 | Hickey | June 15, 1926 |
| 1,763,535 | Nuttall | June 10, 1930 |
| 2,111,983 | Massey | Mar. 22, 1938 |
| 2,121,687 | Daus | June 21, 1938 |
| 2,327,583 | Framhein | Aug. 24, 1943 |
| 2,417,018 | Schroeder | Mar. 4, 1947 |
| 2,417,395 | Framhein | Mar. 11, 1947 |

FOREIGN PATENTS

| Number | Country | Date |
| --- | --- | --- |
| 517,335 | France | May 4, 1921 |